United States Patent [19]

Achenbach et al.

[11] 4,226,837

[45] Oct. 7, 1980

[54] PROCESS FOR CONVERTING SILICON DIOXIDE CONTAINING WASTE FLUE DUST TO CRYSTALLINE ZEOLITIC MOLECULAR SIEVES OF TYPE Y WITH A FAUJASITE STRUCTURE

[75] Inventors: Karl Achenbach, Frankfurt; Günter Türk, Hanau, both of Fed. Rep. of Germany

[73] Assignee: Duetsche Gold- Und Silber-Scheldeanstalt vormals Roessler, Frankfurt, Fed. Rep. of Germany

[21] Appl. No.: 849,612

[22] Filed: Nov. 8, 1977

[30] Foreign Application Priority Data

Nov. 11, 1976 [DE] Fed. Rep. of Germany ....... 2651446

[51] Int. Cl.$^3$ .............................................. C01B 33/28
[52] U.S. Cl. ..................................... 423/118; 423/329
[58] Field of Search .................... 423/118, 328–330, 423/179, 206 R, 208, 210, 215.5, 332; 210/63

[56] References Cited

U.S. PATENT DOCUMENTS

| | | |
|---|---|---|
| 2,882,244 | 4/1959 | Milton ................................... 423/328 |
| 3,017,347 | 1/1962 | Kratz .................................... 210/63 R |
| 3,130,007 | 4/1964 | Breck .................................... 423/328 |
| 3,343,913 | 9/1967 | Robson ................................. 423/329 |
| 3,489,586 | 1/1970 | Chapman ............................. 423/118 |
| 3,685,963 | 8/1972 | Schwochow et al. ............... 423/329 |
| 3,898,319 | 8/1975 | Weber .................................. 423/329 |
| 4,016,246 | 4/1977 | Whittam .............................. 423/329 |

FOREIGN PATENT DOCUMENTS

| | | |
|---|---|---|
| 39-27314 | 11/1964 | Japan ........................................ 423/334 |
| 48-16438 | 5/1973 | Japan ........................................ 423/332 |
| 49-134593 | 12/1974 | Japan . |
| 49-134599 | 12/1974 | Japan . |
| 51-17519 | 6/1976 | Japan ........................................ 423/332 |

Primary Examiner—Edward J. Meros
Attorney, Agent, or Firm—Cushman, Darby & Cushman

[57] ABSTRACT

Silicon dioxide containing waste flue dust from the producton of silicon metal and silicon alloys is converted to crystalline zeolite molecular sieves of Type Y by (1) dissolving the flue dust in alkali metal hydroxide solution with the formation of alkali metal silicate solution having the module ($SiO_2:Me^I_2O$) in the range of 4.0:1 to 5.0:1 at a temperature of 60°–110° C.; (2) purifying the thus obtained alkali metal silicate solution from organic constituents by treatment with activated carbon and/or an oxidizing agent and separating the nondecomposable residue from the solution; and (3) reacting alkali metal aluminate solution present at room temperature with the diluted, purified alkali metal silicate solution with a module ($SiO_2:Me^I_2O$) of 4.0:1 to 5.0:1 obtained by steps (1) and (2) and subsequently crystallizing the reaction mixture ($SiO_2:Al_2O_3=4$–7:1, $Me^I_2O:SiO_2=0.4$–0.7, $H_2O:Me^I_2O=30$–50:1) at a temperature of 75°–100° C. with stirring for a period of 8–48 hours, subsequently filtering to remove the product from the mother liquor, washing and drying to recover a zeolite molecular sieve of Type Y with a Faujasite structure having a degree of whiteness according to Berger (A. Berger, Die Farbe, 8 Nr. 4/6 (1959) 187–202) at 460$\mu$ in the range of 90–95%.

23 Claims, No Drawings

PROCESS FOR CONVERTING SILICON DIOXIDE CONTAINING WASTE FLUE DUST TO CRYSTALLINE ZEOLITIC MOLECULAR SIEVES OF TYPE Y WITH A FAUJASITE STRUCTURE

BACKGROUND OF THE INVENTION

The invention is directed to a process for the conversion and utilization of silicon dioxide containing waste flue dusts from the production of silicon metal and silicon alloys to crystalline zeolitic molecular sieves of Type Y with the Faujasite structure.

There are known various processes for the production of alkali silicates whose aqueous solutions are employed in combination with sodium aluminate and sodium hydroxide in special precipitation methods for the recovery of zeolites:

In the melt process, which is predominantly practical today, silicon dioxide (quartz) is reacted with soda (sodium carbonate) in a melt at high temperature. This melt process has the disadvantage that there is required considerable energy input to carry it out. Besides the melt process is expensive in regard to apparatus and therefore, requires considerable capital. On account of the high operating temperature, the molten compositions, furnace ceiling and recuperators are subjected to high wear and tear. Besides the melt process is characterized by an especially careful selection of the quartz sand employed, particularly in regard to the iron and aluminum content (Ullmann's Enzyklopädie der technischen Chemie, Vol. 15, 3rd edition, pages 732-733).

In the wet decomposition process, which is also known, the reaction is difficult to carry out quantitatively since in using natural sand it is only reacted relatively slowly and incompletely. According to this wet decomposition process it is only possible to operate discontinuously in an autoclave and therewith intensive as to working and energy. The discharged waterglass is dilute and in transporation leads to increased costs (Ullmann's Enzyklopädie der technischen Chemie, Vol. 15, 3rd edition, page 736).

To partially avoid the above-mentioned disadvantages there is used as the starting material for the production of alkali silicates in Japan naturally occurring volcanic sand.

It has also been proposed already to use for the production especially pure alkali silicates, particularly for industrial purposes, pyrogenically produced, chemically high pure, amorphous silica as the starting product (Ullmann's EnzyklopULM/a/ die der technischen Chemie, Vol. 15, 3rd edition, page 735). This method of production, however, has the disadvantage that because of the high cost of starting material the recovered alkali silicate solution can be employed for special purposes, however, not on a technologically broad basis.

To recover waterglass solutions from industrial waste products there has already been proposed the working up of waste silica as it precipitates in the production of $Na_2AlF_6$, $AlF_3$, $NaF$ and $HF$ from the hexafluorosilicic acid, $H_2SiF_6$, arising out of the raw phosphate process (Biegler, German Pat. No. 2 219 503). However, there is obtained only a waterglass with limited stability since the incompletely removed fluoride ion catalyzes the polymerization of the waterglass. Besides the content of toxic fluoride is disturbing in the subsequent working up of this material.

Recently there have been attempts to work up other high silica containing waste products to form waterglass. Thus, in the recovery of silicon carbide which is produced in the electric furnace by metallurgical process there is formed as the reaction product a large amount of wet gases which initially contain silicon monoxide which then is oxidized with the entrance of air oxygen to highly dispersed silicon dioxide. The reaction gases additionally also contain solid impurities which together with the silicon dioxide is separated in considerable amounts as flue dust from the waste gases. The resulting flue dust possesses a high content of amorphous $SiO_2$. As impurities besides other oxides such as $Fe_2O_3$, $Al_2O_3$, $MgO$ and $CaO$ there is also found carbon used in the form of graphite in the electrodes. It enters in finely divided form in the waste gas and gives the flue dust a black-gray color. Furthermore, the eliminated products contain impurities originating from the reaction of quartz with, for example, oil coke. Furthermore, there are also contained in the flue dust organic materials formed by thermal decomposition out of the coal tar or dextrin used as binders in the electrode material, which arrive in the $SiO_2$ containing waste gas as cracked products. These materials are firmly adsorbed by the extremely finely divided silica in the waste dust.

The waste flue dust also accumulates in considerable amounts in the production of silicon-iron alloys. Thus, there is formed in the reducing production of one ton of silicon-iron alloy 0.2-0.5 ton of dust. The reuse of this dust by recycling in the electric furnace to be sure has been tried but because of the necessity of a granulating process has little profitability. Since until now there has been no significant industrially or economically practical possibility of use the waste flue dust according to the state of the factory is either given off to the atmosphere as a white smoke (aerosol) and forms the basis of a severe air pollution or it is collected in the sea and rivers or is brought to deposits.

To be sure there has already been proposed the chemical preparation of silica containing waste flue dusts by decomposition with alkali hydroxide in the wet process. Thereby there is produced from the unpurified waterglass solutions obtained silica gels with the aid of acids. These silica gels, however, have only limited use because of the previously mentioned solid and soluble impurities, Japanese opened Sho No. 49-134599 and Japanese opened Sho No. 49-134593.

In the earlier unopened German patent application P No. 26 09 831.7 there is described a process for the preparation of precipitated silicas and silicates from silicon dioxide containing waste flue dusts employing the following combination of process steps:

I. Dissolution of the flue dust in alkali hydroxide solution with formation of an alkali silicate solution with high module ($SiO_2:Na_2O$);

II. Purification of this alkali silicate solution from organic constituents by treatment with activated carbon and/or an oxidizing agent and separation of the non-decomposable black residue from the solution; and, III. Reaction of the purified alkali silicate solution with acids and/or salts of aluminum and calcium or magnesium at temperatures in the range of 60°-110° C. in the pH range of 1-12, subsequent filtration, washing and drying of the filter cake paste as well as comminution of the drier granulate to recover finely divided, amorphous, pure precipitated silica.

Although with the help of this combination of steps for the first time at present there is the possibility to convert the environment loading flue dust to an industrial use, further endeavors are necessary to increase meaningfully by chemical change the dusts whose toxicological hazards have recently been published (J. C. A. Davies, The Central African Journal of Medicine, Vol. 20 (No. 7), July 1974, pages 140-143 and D. M. Taylor, J. C. A. Davies, The Central African Journal of Medicine, Vol. 21 (No. 4), April 1975, pages 67-71).

The invention therefore is based on the problem of developing a chemical process for the preparation of crystalline zeolitic molecular sieves of Type Y with the Faujasite structure from silicon dioxide containing waste flue dusts from the production of silicon metal and silicon alloys. Type Y zeolite molecular sieve is a very valuable product with extensive possibilities for use, e.g., as adsorption agent for the drying of gases and liquids, as separating agent for the decomposition of gas mixtures, as catalysts and as catalyst constituents, as ion exchanger for drinking water and industrial waste water.

SUMMARY OF THE INVENTION

The process of the invention includes the following features:

I. The flue dust is dissolved in alkali metal hydroxide solution with the formation of alkali metal silicate solution having a module ($SiO_2:Me^I_2O$) in the range of 4.0:1 to 5.0:1 at a temperature in the range of 60°-110° C;

II. The thus obtained alkali metal silicate solution is purified from organic constituents by treatment with activated carbon and/or an oxidizing agent; and, III. Reacting alkali metal aluminate solution present at room temperature with the diluted, purified alkali metal silicate solution having the module ($SiO_2:Me^I_2O$) in the range of 4.0:1 to 5.0:1 obtained by steps I and II, and subsequently crystallizing the reaction mixture ($SiO_2:Al_2O_3=4-7:1$, $Na_2O:SiO_2=0.4-0.7:1$, $H_2O:Na_2O=30-50:1$ at a temperature of 75°-100° C. with stirring for a period of 8-48 hours, subsequently filtering, washing to pH of about 10-11 and drying to recover a crystalline zeolite molecular sieve of Type Y with a Faujasite structure having with a degree of whiteness according to BERGER (loc. cit.) at 460μ in the range of 90-95%.

While mention is made of $Na_2O$ in the formulation above if the alkali metal of the silicate and the aluminate is potassium then the $Na_2O$ will be replaced by $K_2O$.

The diluted alkali metal hydroxide containing mother liquor resulting from the molecular sieve crystallization in step III can be mixed with commercial 45-50% sodium hydroxide with avoidance of the energy expensive evaporation and be returned in the decomposition process of the FeSi (or Si) flue dust according to step I to alkali metal silicate solution with a module ($SiO_2:Me^I_2O$) 4.0:1 to 5.0:1.

The return of the mother liquor from step III can also be carried out in such manner that solid sodium silicate with a module of $SiO_2:Na_2O=3.3:1$ dissolves in this mother liquor, and then is returned to step I. Thereby there is permitted to be established by decomposition of the flue dust a module between 4.0 and 5.0:1. Under these conditions there are obtained zeolite molecular sieves of Type Y from the thus obtained sodium silicate solutions, which in a given case undergo filtration and purification steps.

As alkali metal hydroxide solutions there can be used sodium hydroxide or potassium hydroxide.

To remove the impurities from the alkali metal silicate solutions resulting from the decomposition process there are used as oxidizing agents hydrogen peroxide or alkali metal peroxides, e.g., potassium peroxide, or more preferably sodium peroxide, which is added either during the decomposition or shortly before the separation of the undecomposed residue or also shortly thereafter.

In an especially advantageous manner the removal of the impurities by means of activated carbon treatment according to step II is carried out shortly before the separation of the non-decomposable residue of the alkali metal silicate solution or the activated carbon treatment is combined with the treatment with the oxidizing agent. As activated carbon there is particularly suited one prepared from pure wood charcoal by steam activation at red heat and having a water content of 10%, a specific surface area according to BET in the range of 600-800 m²/g, a pH of 9-10 and a fineness of grinding of 80% below 40 nm.

As proof of the industrial advance of the process of the invention below there is given a comparison of the energy requirements for the production of a zeolitic molecular sieve of Type Y from sand, soda and sodium aluminate by the known melt process (A) and by the process of the invention (B) from FeSi-flue dust, sodium hydroxide and sodium aluminate.

From Table 1 the numerical, experimental values are ascertained and compared to kcal/kg $SiO_2$ standardized values. The table contains three horizontal series of numbers: of these the first series relates to the energy requirement which is employed per kg $SiO_2$ in the liquid waterglass phase, while in the second series of numbers there is found the energy requirement by unit of weight (kg) of the zeolitic molecular sieve of Type Y (100% calculated) from the same liquid waterglass according to steps A and B. The third series of numbers finally represents the sum of the first and second series of numbers and also represents the total energy expense which is employed in order to produce crystalline, zeolitic molecular sieves of Type Y by processes A and B from the $SiO_2$-sand source or FeSi-flue dust. In the numerical comparison it is noticeable that in recovering waterglass according to melt process A the energy requirement to obtain waterglass is 3.2 times higher than in process B of the invention. While in process A the portion of energy for recovering liquid waterglass still makes up 28% of the total energy requirement, for process B according to the invention this portion is only 11% of the invention. Measurements and total energy expense show that process B of the invention in comparison to known process A brings about a 20% saving in energy.

The advance in the art of the duplex process of the invention is illustrated further by a number of advantages over the known procedures.

Commercial waterglass as it is recovered according to the state of the art, e.g., according to the melt process, has a $SiO_2:Na_2O$ ratio of maximal 3.5:1. For the production of zeolite molecular sieves of Type Y with a Faujasite structure and a $SiO_2:Al_2O_3$ ratio of 24 3.0 one is instructed to add amorphous silica in the form of precipitated silica or silica sol (German OS No. 18 12 339). With the help of the waterglass producible by the invention having a high module ($SiO_2:Na_2O=5.0:1$) there is avoided the addition of amorphous $SiO_2$ in the form of expensive filling silica and expensive silica sol and the synthesis of Type Y molecular sieves is carried out very advantageously.

A further substantial advantage is the fact that the duplex process of the invention presents the possibility of recycling the alkali metal hydroxide containing diluted mother liquor without the use of an evaporation process as a result of which there is a considerable saving of energy.

In the case of evaporation besides an expensive plant for concentrating the diluted mother liquor is required which can be saved by the present invention.

In addition to silicon and ferrosilicon alloy other silicon alloys can be used in the invention, e.g., silicomanganese, chromium silicide, ferrochromium-silicon, vanadium silicide, titanium silicide and silicon-aluminum alloy.

Unless otherwise indicated all parts and percentages are by weight.

The process can comprise, consist essentially of or consist of the steps set forth with the stated materials.

The process will be further illustrated in the following examples, but they are not intended to limit the invention.

DESCRIPTION OF THE PREFERRED EMBODIMENT

EXAMPLE 1

As the starting raw product there were added
(a) a flue dust resulting from the production of ferrosilicon (FeSi) with the following analytical and physical data:
$SiO_2$:89.55%
$Fe_2O_3$:0.90%    $Al_2O_3+MgO+CaO+Na_2O+K_2O$:3.90%
SiC:0.40%
C:1.40%
Loss on ignition (at 1000° C.):3.20%
Bulk density:250 grams/l
Particle size:60 microns
(b) a flue dust resulting from the production of metallic silicon with the following data:
$SiO_2$:97.5%
$Fe_2O_3$:0.10%
$Al_2O_3+MgO+CaO+Na_2O+K_2O$:2.10%
SiC:0.30%
C:1.40%
Loss on ignition (at 1000° C.): 3.20%
Bulk density: 250 grams/l
Particle size: 90 microns

Decomposition Process

There were filled into a 50 liter capacity vessel of V2A-steel 25 liters of water and 1.75 kg of solid NaOH dissolved therein. The mixture was heated to 70°–90° C. and there was introduced with stirring with an intensive stirrer 4.25 kg of product (a). This mixture was heated for 45 minutes at 95° C. and there were then introduced 4.25 kg of flue dust product (b). After a reaction time of 3 hours at 95°–97° C. and uncovering the vessel the decomposition mixture was pumped from the reaction vessel and was filtered off hot from carbon containing non-decomposable residue by means of a suitable filtering apparatus (rotary filter, band filter or filter press) using filter cloths of Perlon. The decomposition solution before the filtration was diluted with 10 liters of hot water. For fine filtration there is used a rotary disk filter and the operation is carried out with the help of settling technology. There were obtained 40 liters of a water white sodium silicate solution which contained 229 grams of $SiO_2$/l and 49.6 grams of $Na_2O$/l (d=1.23) and which had a module of $SiO_2:Na_2O=4.77:1$.

Purification

To remove organic impurities there were added to the decomposition solution about 1 hour before the end of the reaction 167 grams of activated carbon. In order to even improve the purification effect there were added to the decomposition solution after the addition of the activated carbon sodium peroxide in an amount of 0.5 gram/l (20 grams $Na_2O_2$). As an alternative procedure in place of sodium peroxide there can be added 10 ml of aqueous hydrogen peroxide solution (35%) per liter of waterglass, preferably after the filtration.

EXAMPLE 2

The production of a molecular sieve with Faujasite structure of Type Y was carried out as described below.

An amorphous gel was formed at room temperature in a rubberized 100 liter container provided with a cover, double jacket for heating fluid, stirrer and bottom outlet valve from 10 liters of a sodium aluminate solution (204 grams of $Al_2O_3$/l; 210.8 grams of $Na_2O$/l; d=1.36 grams/ml) and 31.5 liters of a waterglass solution propared according to Example 1. After the homogenization of the amorphous gel by stirring it was heated to 85° C. and the reaction mixture ($SiO_2:Al_2O_3=6.0:1$; $Na_2O:SiO_2=0.5:1$; $H_2O:Na_2O=37.1$) brought to crystallization at this temperature during 24 hours without stirring. The washed, dried and activated zeolite had a water uptake of 32 grams/100 grams (at 25° C., 10 Torr) was according to its X-ray analysis a pure Faujasite of Type Y. It had a degree of whiteness according to BERGER (loc.cit.) at 460μ of 92%.

EXAMPLE 3

There was used a purified waterglass solution with a high module which was produced according to Example 1. In the reaction vessel described in Example 2 having a capacity of 100 liters there were present 26.3 liters of a sodium aluminate solution (194 grams of $Al_2O_3$/l, 196 grams of $Na_2O$/l, density 1.34 g/ml). This solution was thereupon treated under continuous stirring at room temperature with 78.6 liters of a carefully purified sodium silicate solution (229 grams $SiO_2$/l; 49.6 grams $Na_2O$/l; module32 $SiO_2:Na_2O=4,77:1$; d=1.23 g/ml) which was produced by decomposition. The gel formed was heated under continuous stirring to 90° in three hours. Then the heating and stirrer were disconnected and the reaction mixture ($SiO_2:Al_2O_3=6:1$; $Na_2O:SiO_2=0.49.1$; $H_2O:Na_2O=38.1$) left alone. The temperature dropped to about 70°–75° C. The product was decanted several times with water and the crystal mass separated from the mother liquor over a filter press and washed. Then the molecular sieve was dried.

The X-ray analysis showed that zeolite was a Faujasite of Type Y. The activated zeolite at 25° C. and 10 Torr had a water adsorption capacity of 32.5 grams/100 grams. The degree of whiteness according to BERGER (loc.cit.) at 460μ was 91%.

While in the working examples there is employed a mixture of flue dusts from metallic silicon and ferrosilicon alloy it should be realized that there can be used either the flue dust from metallic silicon or the flue dust from the silicon alloy alone.

Table No. 1

Energy Requirement, Comparison of Melt Process and Wet Process
A = Melt or vat process from sand and soda
with following production of zeolite molecular sieve of Type Y
B = Wet decomposition process from FeSi-flue dust and sodium hydroxide
with following production of zeolite molecular sieve of Type Y

| Process Variant | A | B |
|---|---|---|
| Energy requirement for liquid waterglass kcal/kg $SiO_2$ in liquid glass | 1,310 (28%) | 412 (11,0%) |
| Energy requirement for zeolitic molecular sieve of Type Y kcal/kg zeolitic molecular sieve of Type Y* | 3,300 (72%) | 3,300 (89.0%) |
| Total energy requirement** kcal/kg zeolitic molecular sieve of Type Y* | 4,610 (100%) | 3,712 (100%) |

*Zeolite Y calculated "atro" (active dry substance) = 100%; as spray dried powder with 20% $H_2O$
**Saving of energy with process B of the invention 21% compared to the conventional process A

What is claimed is:

1. A process for the preparation of crystalline zeolite molecular sieves of Type Y from waste flue dust containing silicon dioxide obtained from the production of silicon metal or a silicon alloy or is a mixture of flue dusts from the production of silicon metal and silicon alloy comprising (1) dissolving the flue dust in alkali metal hydroxide solution with the formation of alkali metal silicate solution having the mole ratio $SiO_2$:$Me^I_2O$ in the range of 4.0:1 to 5.0:1 at a temperature of 60°-110° C.; (2) purifying the thus obtained alkali metal silicate solution from organic constituents by treatment with activated carbon or an oxidizing agent or a mixture of activated carbon and oxidizing agent and separating the non-decomposable residue from the solution; and, (3) reacting alkali metal aluminate solution present at room temperature with the purified alkali metal silicate solution with a mole ratio $SiO_2$:$Me^I_2O$ of 4.0:1 to 5.0:1 obtained by steps (1) and (2) and subsequently crystallizing the reaction mixture ($SiO_2$:$Al_2O_3$=4–7:1, $Me^I_2O$:$SiO_2$=0.4–0.7, $H_2O$:$Me^I_2O$=30–50:1) at a temperaure of 75°-100° C. with stirring for a period of 8–48 hours, subsequently filtering to remove the product from the mother liquor, washing and drying to recover a zeolite molecular sieve of Type Y with a Faujasite structure having a degree of whiteness according to BERGER at 460μ in the range of 90–95%.

2. The process of claim 1 wherein the flue dust is obtained from the production of silicon metal, ferrosilicon or is a mixture of flue dusts from the production of silicon metal or silicon alloy.

3. The process of claim 2 wherein the alkali metal of the hydroxide, silicate and aluminate is sodium.

4. The process of claim 2 comprising mixing the mother liquor, said mother liquor containing alkali metal silicate and alkali metal hydroxide, of step (3) with more concentrated alkali metal hydroxide solution to produce an alkali metal silicate solution having the mole ratio $SiO_2$:$Me_2^IO$ of 4.0:1 to 5.0:1 and returning the thus produced alkali metal silicate solution to step (1).

5. The process of claim 4 wherein the alkali metal of the hydroxide, silicate and aluminate is sodium or potassium.

6. The process of claim 5 wherein the alkali metal is sodium.

7. The process of claim 6 wherein the more concentrated alkali metal hydroxide is 45–50% aqueous sodium hydroxide.

8. The process of claim 6 wherein the purification is carried out with (a) activated carbon, (b) hydrogen peroxide, (c) alkali metal peroxide or (d) a mixture of activated carbon with hydrogen peroxide or alkali metal peroxide.

9. The process of claim 8 wherein the alkali metal peroxide of (c) or (d) is sodium peroxide.

10. The process of claim 2 comprising dissolving solid alkali metal silicate with the mole ratio $SiO_2$:$Me_2^I$=3.3:1 in the mother liquor, said mother liquor containing alkali metal silicate and alkali metal hydroxide, and then returning the thus formed solution to step (1).

11. The process of claim 10 wherein the alkali metal of the hydroxide, silicate and aluminate is sodium or potassium.

12. The process of claim 11 wherein the alkali metal is sodium.

13. The process of claim 11 wherein the purification is carried out with (a) activated carbon, (b) hydrogen peroxide, (c) alkali metal peroxide or (d) a mixture of activated carbon with hydrogen peroxide or alkali metal peroxide.

14. The process of claim 13 wherein the alkali metal peroxide of (c) or (d) is sodium peroxide.

15. The process of claim 2 wherein the alkali metal of the hydroxide, silicate and aluminate is sodium or potassium.

16. The process of claim 15 wherein the purification is carried out with (a) activated carbon, (b) hydrogen peroxide, (c) alkali metal peroxide or (d) a mixture of activated carbon with hydrogen peroxide or alkali metal peroxide.

17. The process of claim 16 wherein the alkali metal peroxide of (c) or (d) is sodium peroxide.

18. The process of claim 17 wherein in step (2) there is used both activated carbon and sodium peroxide.

19. The process of claim 17 wherein there is employed hydrogen peroxide or alkali metal peroxide and said hydrogen peroxide or alkali metal peroxide is employed at a point in time from shortly before the separation to a point in time shortly after said separation.

20. The process of claim 16 wherein there is employed (a) activated carbon or (d) a mixture of activated carbon with hydrogen peroxide or alkali metal peroxide in the purification.

21. The process of claim 20 wherein the activated carbon is employed either alone or in admixture with hydrogen peroxide or alkali metal peroxide shortly before the separation of the non-decomposable residue from the alkali metal silicate solution.

22. The process of claim 20 wherein the activated carbon is one prepared from pure wood charcoal and has a water content of 10%, a BET surface area in the range of 600–800 m²/g, a pH of 9–10 and a degree of fineness of 80% below 40 microns.

23. A process according to claim 1 wherein the reaction mixture has a mole ratio $SiO_2$:$Al_2O_3$ of 6:1.

* * * * *